3,741,863
METHOD OF RECYCLING WASTE CELLULOSIC MATERIALS
S. Hunter W. Brooks, Richmond, Va., assignor to The Rust Engineering Company, Pittsburgh, Pa.
Filed Aug. 27, 1971, Ser. No. 175,487
Int. Cl. D21b 1/08
U.S. Cl. 162—4
20 Claims

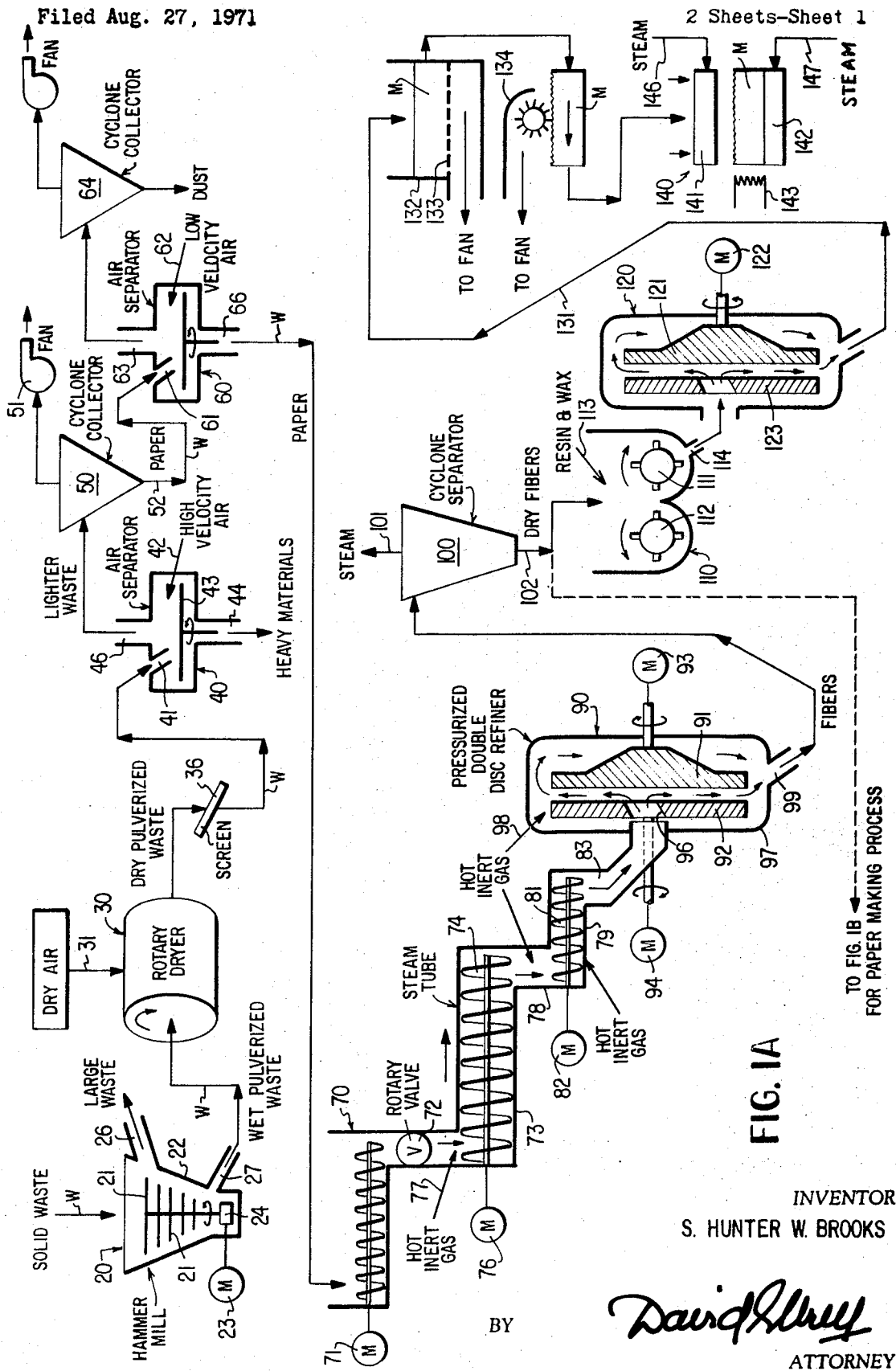

ABSTRACT OF THE DISCLOSURE

Method of providing cellulosic fibers and fiber bundles from sources of waste material, such as municipal and industrial waste products, for making medium density fiberboard and/or paper. The waste material is first pulverized or shredded into small pieces and then dried to remove excess moisture and to sterilize the material. The dried waste material is passed through one or more separators to remove the glass, metals, and other non-cellulosic materials therefrom, leaving the cellulosic materials for further treatment. After further heating the cellulosic materials in the presence of a nonflammable medium, such as steam, to raise its temperature and further sterilize the material, the cellulosic pieces are abraded under a pressure and temperature sufficient to break down the hydrogen bonds and to soften any lignin and other resins present, in what is referred to as a dry-refining process. This frees the fibers and fiber bundles from one another, and provides relatively long, thin, soft fiber structures. The fibers and fiber bundles are then intimately mixed with a resin and formed into a mat, after which the mat is compressed under heat and pressure to form a fiberboard. Alternatively, to make paper, the fibers are dispersed in water, formed into a sheet, compressed, and then dried.

BACKGROUND OF THE INVENTION

Field of the invention

This invention relates in general to method of making fiberboard and paper from recycled cellulosic materials, and more particularly, to methods of providing recycled cellulosic fibers and fiber bundles suitable for use in board and paper making from a "dry-refining" process.

Description of the prior art

The municipalities of this country are more and more faced with a serious problem of disposing of the household and industrial trash which results from our ever-growing population. In addition, many cities also have a substantial amount of waste resulting from the tree and grass trimmings and other cellulosic products which vegetate in the city.

In the past, many municipalities have disposed of these products by using landfills which were within a reasonable distance of the city. As available sanitary landfills have become greater and greater distances from the heart of the city, and the transportation costs have soared, this has become a less desirable method of disposing of these waste products.

Another means of disposal is incineration, which has obvious drawbacks, such as, air pollution, initial high capital investment and destruction of the waste, which in many cases has value.

There have been several attempts to recycle these products in recent years in order to conserve the nation's natural resources, as well as avoid the concomitant pollution caused by the various methods of disposal used in the past. Thus, several commercial products, such as bricks, fiber glass, and glass wool, have recently been introduced using the glass which is found in municipal waste. The ferrous and non-ferrous metals can also be reused by known processes, once they are separated from the other waste materials.

There have also been attempts to recycle the cellulosic products contained in the municipal waste, but with somewhat less success. There is a method, referred to as a "wet process," which utilizes a wet grinder or a hydra-pulper for reducing the waste cellulosic products to a fibrous form for subsequent re-use in paper or other products. This process has various drawbacks including a rather small yield, and a large amount of effluent in the form of contaminated water, which creates a secondary problem of disposal. Also, this process has been criticized for only recovering the long fibers, but not the short ones. Additionally, there is the problem of sterilization of the fibers which is complicated by the presence of the large quantity of water or effluent.

The method of the instant invention has solved numerous of the above problems by (1) providing a substantially higher yield than was previously obtained; (2) reducing the effluent or polluted water to essentially zero; (3) the short as well as the long fibers are recovered for subsequent reuse; and (4) the process contains one or more heating steps which accomplish sterilization of the waste without the high cost which is incurred when large quantities of water are heated.

SUMMARY OF THE INVENTION

In accordance with the present invention, fiber suitable for making fiberboard, and/or paper products and for hydro-mulching are made in accordance with a dry process utilizing the cellulosic products present in municipal and household wastes. The waste is pulverized into small pieces, whereafter it is dried to remove excess moisture, and also for sterilization. After separating the cellulosic material from the other constituents of the waste, the cellulosic material is heated in the presence of a nonflammable medium, such as steam, to raise the temperature thereof and to effect further sterilization. The heated cellulosic material is then abraded under pressure and at a temperature sufficient to rupture the hydrogen bonds and to cause softening of any lignin and other resins present in the material to separate the fibers and fiber bundles from one another. After separating the fibers and fiber bundles from the nonflammable medium, a resin is added to the fibers and intimately mixed therewith. The fibers and resins are then formed into a mat which is compressed under heat and pressure to form a board.

In an alternative process, the recovered fibers and fiber bundles are dispersed in a bonding agent, formed into a mat, and then compresed and heated in order to make a sheet of paper.

Accordingly, a primary object of the invention is to provide a method for obtaining fibers and fiber bundles from recycled cellulosic materials, suitable for reuse in making fiberboard and/or paper.

Another object is to provide a method for recycling cellulosic waste products with a high yield or high rate of recovery.

A further object of the invention is to provide a method for recycling waste cellulosic products in which there is a minimal amount of effluent or polluted water created as a by-product.

Another object of the invention is to provide a method for recycling waste cellulosic products and recovering the short as well as the long fibers contained therein.

It is another object of the invention to provide a method of recycling waste cellulosic products wherein the fibers are sterilized prior to being made into board or paper to kill any bacteria and/or microorganisms that may be contained therein.

It is a further object of the invention to provide a process for recovering cellulosic fibers and fiber bundles from household and municipal waste by a dry process which minimizes the energy and the capital investment required for the recovery.

Another object is to provide a new and different type of fiberboard and/or paper made from recycled waste cellulosic materials.

A still further object of the invention is to provide a mehod for recovering fibers and fiber bundles from waste cellulosic products utilizing equipment which is commercially available and providing end products which are suitable for resale to recover a substantial amount of the cost of disposing of the municipal and household wastes.

DESCRIPTION OF THE DRAWINGS

With the above and other objects in view that will hereinafter appear, the nature of the invention will be more clearly understood by reference to the following detailed description, the appended claims, and the several views illustrated in the accompanying drawings, in which:

FIGS. 1A and 1B are diagrammatic drawings showing the equipment and the steps for recycling waste cellulosic material into fiberboard and/or paper, respectively, in accordance with the instant invention.

DETAILED DESCRIPTION OF INVENTION

Figure 1B:
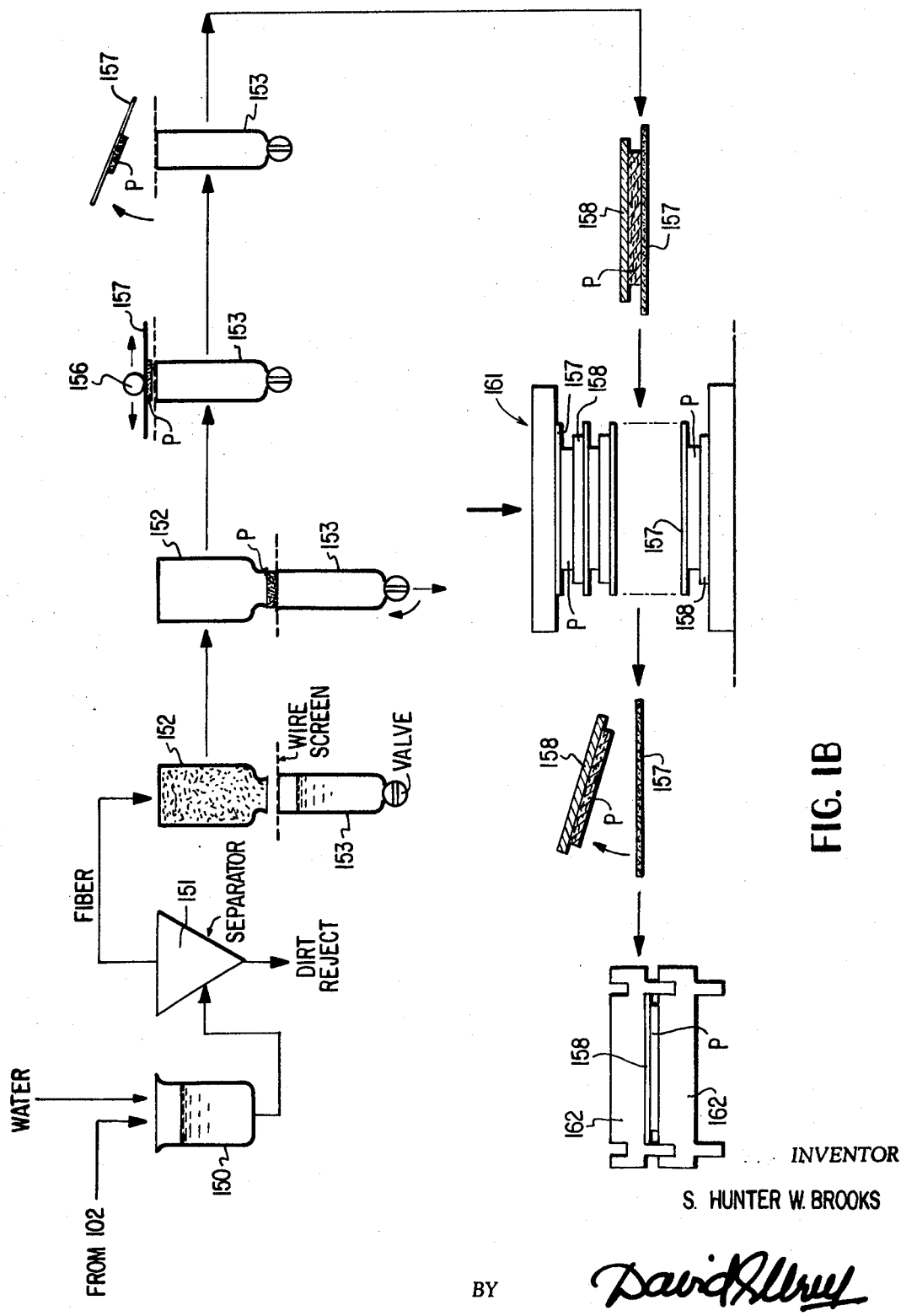

Referring to FIG. 1A, there is shown a diagrammatic view of the various steps involved in the instant process of making fiberboard and/or paper from recycled municipal waste cellulosic products. The waste material W is originally delivered to a hammer mill 20 for pulverization into smaller pieces. (The designation W, as used hereinafter, shall identify that portion of the waste which is being reclaimed for further processing.) A typical hammer mill contains a series of rotating hammers 21—21 within a housing 22, the hammers 21—21 being rotated by a motor 23 through a suitable drive train 24. The large heavy waste materials are expelled through an opening 26, whereas the lighter waste materials W work their way to the bottom and are expelled through an outlet 27.

This lighter weight, wet pulverized waste is conveyed to a rotary dryer 30. Suitable hot, dry air of approximately 700° F. is supplied to the dryer 30, as shown at 31. When the waste W exits the rotary dryer 30 it is substantially dried, being 85% solids, and is at a temperature of approximately 200° F., plus or minus 20° F. It is generally agreed that 180° F. is sufficient to pasteurize or sterilize the material.

The pulverized waste W at this point still contains glass, metal and other components which must be removed prior to reducing the cellulosic waste pieces to a fibrous form. Accordingly, the dry pulverized waste W is conveyed to one or more screens 36 which remove the very small material, such as crushed glass, and also takes out oversized materials, such as metals.

Th waste W is then conveyed to a first air separator 40 through an inlet 41. High velocity air is injected into the separator 40, as indicated at 42. A rotating turntable 43 mounted inside the separator 40 whirls the falling waste W outwardly. The heavy materials, such as the organics and other components exit the air separator 40 through an outlet 44, whereas the lighter waste W, which includes the cellulosic and plastic components, is expelled through an outlet 46. The lighter waste W is conveyed to a cyclone separator 50. A fan 51 removes the dust particles from the waste, and the paper and other components are taken off at the bottom of the collector, as indicated at 52.

The paper, fabric, film, foil and other matter is then conveyed to a second air separator 60 through an inlet 61. Low velocity air is injected into the separator 60, as indicated at 62. The dust and other light particles exit through light the outlet 63 to a cyclone collector 64; whereas the paper is removed from the bottom of the separtaor 60 through an outlet 66.

Various tests and experiments with municipal waste, have indicated that approximately 45% of the total amount of waste that enters the system consists of cellulosic products which can be ultimately recovered at the outlet 66. The bulk of the cellulosic products that are recovered consists of newsprint which is a generally low grade form of fiber. There are other constituents in the typical municipal waste however, such as, wet strength paper and varying amounts of wood and wood chips which are also suitable for recycling and which should appear at the outlet 66.

It should be understood that the cellulosic waste W which is recovered at the outlet 66 is suitable for use in making various grades of fiberboard and/or paper. However, it is not essential that 100% household waste be used in this recycling process. For example, it is possible at this point in the process to insert municipal waste materials coming from other sources, such as waste wood of the trees and shrubbery in the particular municipality, the waste materials from a typical furniture making plant in the vicinity, the waste material from a plant making wet strength paper, such as a container manufacturing company, and demolition and pallet wastes. The invention will be described primarily with reference to 100% household type of waste, although it is to be understood, that various other forms of waste could also be suitably recycled in certain percentages, to be more fully described hereinafter.

The cellulosic waste W is then conveyed through a line 67 to a horizontal screw conveyor 70 which is driven by a motor 71. A metered amount of material is passed through a rotary valve 72 into a steam tube 73. The steam tube has a rotatable helical screw 74 driven by a motor 76 which conveys the material to the right (FIG. 1) through a hot inert gas injected into the steam tube 73, as shown at 77. The hot inert gas 77 is preferably a saturated steam which is essentially air-free to prevent the possibility of oxidation within the tube 73. However, other suitable inert gases, such as nitrogen, or argon, can be used. The temperature and pressure within the steam tube is typically 70 p.s.i. at approximately 315° F., although these variables are not critical. Also, the steam tube 73 can be arranged vertically if desired, to eliminate the need for the horizontal screw 74. The cellulosic waste W then drops through a vertical section 78, into another horizontal section 79 having a horizontal screw conveyor 81, driven by a motor 82. As shown, the hot inert gas may also be injected in the vertical section 78 as well as the horizontal section 79. The material is then fed through a tube 83 into a pressurized double disc refiner 90. At this point, the temperature of the cellulosic waste W has been raised to approximately 315° F.

The refiner 90 is comprised of a pair of oppositely rotating discs or abraders 91 and 92 which are spaced apart a distance which may vary between approximately 0.001 inch to 0.100 inch, although the preferred range is 0.005 inch to 0.020 inch. The discs 91 and 92 are preferably driven in opposite directions by motors 93 and 94, respectively, although it is to be understood that the discs can also be driven in the same direction. The disc 92 has an aperture 96 therein, through which the cellulosic waste W is fed into the space between the discs 91 and 92. Steam may be supplied within a housing 97 surrounding the discs 91 and 92, as indicated by element 98, although ordinarily the steam that enters with cellulosic waste W is adequate.

During refining, the energy delivered by the motors 93 and 94 is converted to heat. Any water remaining in the cellulosic waste is normally evaporated by that heat. The steam phase may even become superheated in the refining zone and thus provide a dry refining condition on the occasion when the sensible and latent heat required for vaporizing the water in the cellulosic waste is less than the equivalent amount of heat furnished by the motors 93 and 94.

The steam which is in the housing 97 of the refiner 90 must be of a sufficient temperature and pressure when combined with the heat of attrition to melt or at least substantially soften any lignin or other bonding agents which are present in the cellulosic waste, without any apparent degradation to the fibers. The temperature at which lignin and most of the other resins present begin to melt or soften is about 340° F.

The "hydrogen bond" which normally bonds together the fibers in paper is also easier to rupture at this elevated pressure and temperature to free the fiber, again without any damage to the fiber quality. It has been found that steam pressures between 35 p.s.i.g. and 100 p.s.i.g. are sufficient to soften the material so that the fibers are separated under the abrading action of the rotating discs 91 and 92. While the temperature of saturated steam at 100 p.s.i.g. is approximately 338° F., it is believed that the temperature of the cellulosic waste reaches substantially higher temperatures in the range of 400°–500° F., due to the added heat of attrition, which is converted to super-heat of the steam medium. Actual measurements of the temperature at a blow line 99 have been recorded at as much as 480° F.

Other factors such as the moisture content of the cellulosic waste W as it enters the steam tubes 73 and 79, and the dwell time in the steam tubes 73 and 79 affect the conditions which should exist in the refiner 90. The above described spacing of the discs, and the pressure range inside the refiner 90 are believed to be satisfactory if the incoming cellulosic waste W has a solids content of approximately 85% and a dwell time in the steam tube 73 of approximately 30 seconds. It is essential to soften whatever lignin and other resins are present sufficiently to cause separation of the fibers and avoid abrading the cellulosic waste W into dust.

The yield of the fibers that are recovered from the refiner 90 is approximately 95%–98% of the input at the conveyor 70; and there is essentially no effluent discharged from the refiner 90.

It has been thought in the past that it was necessary to have the cellulosic waste at an elevated moisture content, e.g. 50% solids or less, in order to prevent degradation to the fibers. As described in my co-pending U.S. patent application, Ser. No. 28,503, filed Apr. 14, 1970, now Pat. No. 3,668,286 which is expressly incorporated herein, it has been discovered that virgin fibers suitable for board making could be obtained from kiln-dried wood or air-dried or forced-dried wood. However, it is my belief that this is the first time that acceptable fibers have been obtained by the use of a dry-refining process using as the starting product a municipal waste consisting of newsprint, kraft, paper and cardboard boxes, cloth and other constituents normally found in household waste.

As the cellulosic waste W leaves the refiner 90 at the blow line 99, it is in the form of a mass of fluffy, individual fibers and fiber bundles which are conveyed to a cyclone separator 100. The steam is vented through the top of the separator 100, as shown at 101, and the dry fibers are taken off at the bottom of the separator, as shown at 102.

These fibers can be used to make fiberboard or paper, or they can be used as a hydro-mulching compound for growing grass or turf. Also, the fibers are highly absorbent and can be used for absorbing oil and other pollutants floating on water, which result from oil spills.

In order to make fiberboard, the fibers and fiber bundles are then fed to a paddle mixer 110 (FIG. 1A) having counter-rotating paddles 111 and 112. A suitable amount of resin-in-water and wax solutions, as shown at 113, is evenly distributed onto the fibers in the paddle mixer 110, where the resin and fibers are in rapid motion. It has been found acceptable to use 8% resin and 1% wax based on the weight of the fiber. In actual practice the resin used was a mixture of largely unreacted and unpolymerized ureaformaldehyde, urea, and melamine. The wax is used as a sizing agent. The formulation of the binder will be discussed in greater detail hereinafter.

The material from the paddle mixer 110 is then fed, as shown at 114, to a single-disc refiner designated 120. The refiner 120 is unpressurized and has a single rotating disc 121 driven by a motor 122 and a stationary disc 123, the construction of which is well known in the art. The refiner 120 acts to re-disperse the fibers and the fiber bundles into individual fibers as well as to complete the dispersion of the resin onto the fibers. The refiner 120 separates any agglomerate of fibers into a fluffy mass.

The mass of fibers, resin and wax is then pneumatically conveyed through a line 131 into a forming box 132 having a screen 133 on which the fibers are made into a mat designated M. The mat M is then passed under a shave-off unit 134 to remove any excess fibers and reduce the size of the mat to a predetermined height. This facilitates the introduction of the mat M into realistically spaced platens of a press 140. The thickness is based on the weight necessary to produce a particular pound per cubic foot density when compressed to a particular thickness. For example, it is common to produce forty-two pound per cubic foot density when compressed to one-half inch thickness.

The mat M is then compressed between platens 141 and 142 of the press 140 to a predetermined ultimate thickness. It has been found that the curing operation can be accomplished in approximately two minutes, whereafter the platens 141 and 142 are opened and the board is removed for cooling. While in the platens 141 and 142, the mat M is heated by the application of a high frequency field 143 so that the unreacted components of the resins (added at 113) react to condense and polymerize and adhere the fibers together by a rigid bond. The platens 141 and 142 are heated by steam, as shown at 146 and 147, respectively, to a temperature which prohibits the condensation of water driven to the surface of the board during the electric heating phase, and permits the springing off of such moisture as steam upon relief of the platen pressure. Since such moisture is held as steam, or at least as saturated liquid at or about the interface between the platens 141 and 142 and the board surface, the springing off of steam upon relief of platen pressure does not disrupt either the surface or the internal structure of the board.

The resin which was used was a mixture of urea-formaldehyde, urea and melamine, as was previously described. The so-called "lignin bond" is not relied upon, as in a typical wet process, and the fiberboard's bond is obtained solely through the use of resin. The system is known as an "in situ" resin system, and normally the resin has no tack, a viscosity of about 50 centipoises or less, and is capable of curing in a very short time under high frequency heating. An "in situ" resin is a solution of high solid content of largely unreacted components of an amino resin in the presence of an acid catalyst, such as ammonium chloride. Also, melamine is added to the resin to give exterior durability.

A somewhat modified resin system, which it is believed would be satisfactory for use in the instant invention, is described in my U.S. Pat. No, 3,207,819, issued on Sept. 21, 1965, which is expressly incorporated herein. Conventional reacted or cooked resins can also be used.

Using the above described process and a urea-formaldehyde, urea, and melamine resin and some wax as a sizing agent, it has been shown that with the proper equipment, densities of 16 to 70 pounds per cubic foot can be achieved at thicknesses of ⅛ inch to 3 inches, or more. The following table represents the approximate data on experience to date, and does not necessarily represent the ultimate limitations of the process:

| Thickness (inches) | Density (lbs./cu. ft.) (oven dry) |
|---|---|
| 3/8 | 52 |
| 1/2 | 41 |
| 3/4 | 41 |

A typical formulation of a largely unreacted resin solution for making board for interior use is as follows:

designate the properties of fiberboards made from the following starting waste products:
Column 1: 100% municipal waste paper
Column 2: 100% waste box broke and wet strength
Column 3: 50% municipal waste paper and 50% southern dry pine chips
Column 4: 50% municipal waste paper and 50% southern dry pine chips
Column 5: 50% municipal waste paper and 50% southern dry pine chips

| Type fiber | 1 | 2 | 3 | 4 | 5 |
|---|---|---|---|---|---|
| Board density (oven dry) (lbs./cu. ft.) | 41.7 | 40.6 | 42.2 | 52.5 | 50.8 |
| Percent solids | 94.2 | 93.5 | 93.8 | 94.3 | 94.7 |
| Thickness (inches) | .492 | .502 | .732 | .352 | .367 |
| Modulus of rupture (p.s.i.) | 1,600 | 2,360 | 1,540 | 4,100 | 3,670 |
| Modulus of elasticity×$10^3$ (p.s.i.) | 124 | 152 | 207 | 625 | 498 |
| Internal bond (p.s.i.) | 11 | 35 | 21 | 96 | 88 |
| Screw hold No. 10 S.M. screw (lbs.): | | | | | |
| Face | 87 | 188 | 167 | 203 | 192 |
| Edge | | | | 92 | |
| Hardness (lbs.) | 900 | 1,450 | 1,167 | 1,950 | 1,950 |
| 24 hr. immersion, percent: | | | | | |
| Thickness swell | 14.6 | 10.5 | 13.0 | 9.7 | 10.7 |
| Water absorption | 29.1 | 14.0 | 31.4 | 23.0 | 26.9 |
| Linear expansion | .75 | .70 | .33 | .51 | .56 |
| Modulus of rupture rentention | 14 | 24 | 38 | 59 | 58 |
| Type resin (percent) resin treatment | (¹) 8 | (¹) 8 | (¹) 8 | (¹) 12 | (¹) 12 |
| Type wax (percent) wax treatment | Paracole 1 | Paracole 1 | Paracole 1 | Paracole 1 | Paracole 1 |
| Mat weight (lbs.) | 17.3 | 17.75 | 27.5 | 16.0 | 16.0 |
| Mat solids (percent) | 95.1 | | 92.3 | 92.0 | 92.0 |
| Heat time (seconds) | 120 | 120 | 170 | 170 | 160 |
| Board solids (out of press) | 98.3 | 98.0 | 97.9 | 97.9 | 97.6 |
| Kw. input (plate amps) | 10.0 | 10.0 | 10.0 | 10.0 | 10.0 |
| Resin: | | | | | |
| pH | 5.2 | 5.2 | 5.2 | 5.2 | 5.2 |
| Cps | 50 | 50 | 50 | 50 | 50 |
| Temp. (° F.) | 77 | 77 | 77 | 75 | 75 |
| Press temperature (° F.) | 300 | 300 | 300 | 300 | 300 |
| Mat thickness (inches) | 9 | 9 | 16¾ | 9⅜ | 9⅜ |
| Fiber bulk density (lbs./cu. ft.): | | | | | |
| Before | 1.8 | 1.8 | 1.1 | 1.2 | 1.2 |
| After | 2.2 | 1.4 | 1.3 | 1.3 | 1.3 |
| Kw. per lb. | 0.55 | 0.55 | 0.36 | 0.62 | 0.62 |

¹ Formulation number 1.
NOTE.—All tests are based on ASTM—1037-66.

Formulation No. 1

| | Parts by weight |
|---|---|
| Urea-formaldehyde (85% solids (urea); 15% liquid (formaldehyde)) | 100 |
| Urea | 46 |
| Melamine | 5.8 |
| Catalyst | 1.5 |

Water as required to provide the desired solids content.

The above formulation was used to make the board shown in FIG. 2.

A typical formulation of a largely unreacted resin solution for making board for exterior use is as follows:

Formulation No. 2

| | Parts by weight |
|---|---|
| Urea-formaldehyde (85% solids (urea); 15% liquid (formaldehyde)) | 100 |
| Urea | 25 |
| Melamine | 35 |
| Catalyst | 1.5 |

Water as required to provide the desired solids content.

The above formulation provides the durability needed for exterior use by the addition of a greater proportion of melamine.

In the following table, each column represents a specific example. In each example, the starting material is somewhat different, although in each case there is a large portion of recycled waste cellulosic materials. In each case, the heating was by means of a high frequency field using a substantially constant frequency of approximately six to eight megahertz with only such minor variations as were necessary to maintain substantially constant power input to the boards.

In the following table, the columns 1, 2, 3, 4, and 5

In each of the specific samples enumerated above, the resin was of the type designated as Formulation No. 1. In columns 4 and 5 the formulation was varied slightly by using a double amount of catalyst. The wax which was used in each example was of the type sold under the trademark, "Paracole," made by Hercules Chemical Company.

The boards which were made and which had the above properties, are useful for various applications including building materials and underlayment. While some of the boards do not meet the full commercial standards for particle board, the boards do result in a useful product which will have application in the future. The boards do meet the minimum modulus of rupture standards for underlayment, and should have application for non-critical use as a filler for furniture (corestock), building material for interior walls, ceilings, and the like, and as a low cost direct replacement for extruded particle board in furniture manufacturing.

The board was made from the 100% municipal waste paper and corresponds to column 1 of the above table.

The board was also given a microbiological examination to determine if the various sterilization steps of the process were satisfactory. It was concluded that the finished board did not contain viable microorganisms, bacteria, or fungus. Also, bacteria which was inoculated into homogenized 10 percent saline dispersions of the board did not survive and proliferate.

On the other hand, fungus did grow in a 10 percent homogenate of both the board made exclusively from recycled waste material and in a 10 percent homogenate of board made at the same time and a like manner from all virgin pine chips. However, fungi did not grow on blocks of either board made 100% from recycled waste, or on blocks of board made from virgin pine chips that were soaking in water. In other tests, fungi appeared to grow more rapidly on virgin board than on board made from 100% recycled waste. Thus, there are positive indications that the board is more mildew resistant than board made from virgin material.

It was concluded that the instant process was safe from a microorganism standpoint, and that any microorganisms present in the ordinary household solid waste would be killed. The killing of the microorganisms takes place in whole or in part in (1) the dryer 30; (2) the refiner 90 with steam at 70 p.s.i., for example, for a minute or so; (3) in the curing press 140 where the temperature exceeds 200° F. for about one minute; and (4) in the presence of excess formaldehyde which is present to ensure complete cure and the urea and melamine (or phenol) resins that are used in the process.

In order to make paper, from the municipal waste on a laboratory scale in a conventional wet process, the dry fibers 102 from the bottom of the separator 100 are dispersed in water (FIG. 1B) at a low consistency, for example, 0.5%, as shown at 150. The slurry is then passed through a centrifugal cleaner 151 to separate any dirt from the fibers. By a 0.5% consistency it is meant that for every 0.5 pound of fiber there are 100 pounds of fiber plus water.

The fibers are put into a handsheet mold 152 and formed into a wet handsheet of paper P by drawing water away from the fibers in the mold, as shown at 153. A couch roll 156 is moved back and forth over the standard TAPPI blotter 157 resting on the wet handsheet P to squeeze out water and compact the handsheet P. The sheet is removed from the wire of the mold 152 with the blotter 157, whereafter the handsheet P is sandwiched between the blotter 157 and a chrome plated, mirror polished plate 158. A plurality of the couched sheets, for example 6 to 10, are pressed between the blotters in a standard TAPPI press 161. The sheets are dried in a constant humidity room (approximately 50% humidity, 70° F.) in standard TAPPI drying rings 162—162 in contact with the plate 158. The handsheet P is then removed from the rings 162—162 and plate 158 after drying. Of course, using a wet process on a commercial scale to make paper would entail certain changes in the process, as are well known in the art.

It is believed that the paper has about 75% of the strength (burst factor, tear, tensile, and the like) of conventional newsprint of the same weight and paper forming conditions.

The paper made in this manner could be used for a low-grade publication paper. If made thicker, for example over 0.009 inch, it is similar to cardboard and can be used as a replacement therefor, such as for box board, or for chipboard.

It is to be understood that the fibers obtained by this process can also be formed into paper by various of the "dry forming" processes or "waterless webs," as more fully described in The Bulletin of Arthur D. Little, Inc., No. 489, May-June 1971. In a dry process, a bonding agent, such as a resin rather than water, is used to bond the fibers into a sheet. The heat which is applied should be sufficient to cure the resin, and is customarily applied to the sheet by a large roll.

It is to be further understood that only preferred embodiments of the invention have been specifically illustrated and described, and variations may be made thereto without departing from the invention, as defined in the appended claims.

I claim:

1. A method of making fiberboard from recycled waste cellulosic products, which comprises the steps of:
    shredding the waste to form small pieces therefrom;
    drying the shredded pieces to at least about 85 percent solids to remove excess moisture and to sterilize the pieces;
    separating the dried cellulosic waste products from the non-cellulosic waste products;
    heating the cellulosic pieces in the presence of a hot nonflammable medium to raise the temperature of the pieces and to further sterilize the pieces;
    abrading the heated celluosic pieces in the nonflammable medium without the addition of water under pressure and temperature sufficient to rupture the hydrogen bonds in the cellulosic pieces and to soften any lignin and other resins in said pieces to separate the fibers and fiber bundles from one another;
    separating said fibers and fiber bundles from said nonflammable medium;
    adding a resin to the fibers and fiber bundles so that they are intimately mixed;
    forming the fibers, fiber bundles, and resin into a mat; and then
    pressing the fibers, fiber bundles, and resin together under heat and pressure to form a fiberboard.

2. A method as recited in claim 1, wherein said nonflammable medium is saturated steam at between 35 and 100 p.s.i.

3. A method as recited in claim 1, wherein said nonflammable medium is saturated steam at about 70 p.s.i.

4. A method as recited in claim 1, wherein the nonflammable medium and the heat of attrition generated by the abrading of the cellulosic pieces raises the temperature of the pieces to at least about 340° F.

5. A method as recited in claim 1, wherein said nonflammable heating medium is steam and said pieces are heated to a temperature of approximately 315° F. prior to the abrading of the cellulosic pieces.

6. A method as recited in claim 1, wherein the resin which is added to the fibers and fiber bundles is a largely unreacted resin solution consisting essentially of urea, formaldehyde, melamine, catalyst and water.

7. A method as recited in claim 1, wherein said shredded pieces are dried in hot gases until the pieces reach a temperature of approximately 200° F.

8. A method as recited in claim 1, wherein said waste cellulosic products are shredded to a size so that they will pass through a one-inch screen.

9. A method of providing cellulosic fibers and fiber bundles suitable for use in board and paper making from waste cellulosic products, which comprises:
    shredding the waste cellulosic products to form small pieces therefrom;
    drying the shredded pieces to at least about 85 percent solids to remove excess moisture and to sterilize the pieces;
    heating the dried pieces in the presence of a nonflammable medium to raise the temperautre of the pieces and to sterilize further the pieces; and then
    abrading the cellulosic pieces in the nonflammable medium under pressure and temperature sufficient to rupture the hydrogen bonds in the cellulosic pieces and to soften any lignin and other resins in said pieces to separate the fibers and fiber bundles from one another.

10. A method as recited in claim 9, wherein said nonflammable heating medium is steam and said pieces are heated to a temperature of approximately 315° F. prior to the abrading of the cellulosic pieces.

11. A method as recited in claim 9, wherein said nonflammable medium is saturated steam at approximately 70 p.s.i.

12. A method as recited in claim 9, wherein the nonflammable medium and the heat of attrition generated by the abrading of the cellulosic pieces raises the temperature of the pieces to at least about 340° F.

13. A method of making fiberboard from waste cellulosic products, such as, paper, cardboard, fabric, film, wood and the like having an initial solids content of at least about 85 percent, commonly existing in municipal waste, which comprises:

shredding the waste cellulosic products having an initial solids content of at least about 85 percent into small pieces;

heating the shredded cellulosic pieces in the presence of a nonflammable medium to sterilize and raise the temperature of the pieces;

abrading the heated cellulosic pieces in the nonflammable medium under pressure and temperature sufficient to rupture the hydrogen bonds in the cellulosic pieces and to soften any lignin and other resins in said pieces to separate the fibers and fiber bundles from one another;

performing the above shredding, heating, and abrading steps without the addition of any water;

mixing the fibers and fiber bundles with a resin;

forming the fibers, fiber bundles, and resin into a mat; and then pressing the fibers, fiber bundles, and resin together under heat and pressure to form a fiberboard.

14. A method of making paper from waste cellulosic products, such as paper, cardboard, fabric, film, wood, and the like having an initial solids content of at least approximately 85 percent, commonly existing in municipal waste, which comprises:

shredding the waste cellulosic products having an initial solids content of at least approximately 85 percent into small pieces;

heating the shredded cellulosic pieces in the presence of a nonflammable medium to sterilize and raise the temperature of the pieces;

abrading the cellulosic pieces in the nonflammable medium to sterilize and raise the temperature of the pieces;

abrading the cellulosic pieces in the nonflammable medium under pressure and temperature sufficient to rupture the hydrogen bonds in the cellulosic pieces and to soften any lignin and other resins in said pieces to separate the fibers and fiber bundles from one another;

performing the above shredding, heating, and abrading steps without the addition of any water;

dispersing the fibers and fiber bundles in a bonding agent;

forming the dispersed fibers and fiber bundles into a mat; and then compressing the mat under heat and pressure to form a sheet of paper.

15. A method as recited in claim 14, wherein said fibers and fiber bundles are dispersed in a bonding agent of water at approximately a 0.5% consistency.

16. A method as recited in claim 14, wherein said bonding agent is a resin, and wherein the sheet is heated to a temperature sufficient to cure the resin.

17. A method as recited in claim 14, wherein said nonflammable medium is saturated steam at between 35 and 100 p.s.i.

18. A method as recited in claim 14, wherein the nonflammable medium and the heat of attrition generated by the abrading of the cellulosic pieces raises the temperature of the pieces to at least about 340° F.

19. A method as recited in claim 14, wherein said nonflammable heating medium is steam and said pieces are heated to a temperature of approximately 315° F. prior to the abrading of the cellulosic pieces.

20. A method of making a sheet of essentially cellulosic material from waste cellulosic products, such as paper, cardboard, fabric, film, wood and the like, commonly existing in municipal waste, which comprises:

shredding the waste cellulosic products into small pieces;

drying the shredded pieces to at least approximately 85 percent solids;

heating the cellulosic pieces in the presence of a nonflammable medium to sterilize and raise the temperature of the pieces;

abrading the cellulosic pieces in the nonflammable medium under pressure and temperature sufficient to rupture the hydrogen bonds in the cellulosic pieces and to soften any lignin and other resins in said pieces to separate the fibers and fiber bundles from one another;

mixing the fibers and fiber bundles with a resin;

forming the fibers, fiber bundles, and resin into a mat; and then pressing the fibers, fiber bundles, and resin together under heat and pressure to form a sheet of essentially cellulosic material.

References Cited

UNITED STATES PATENTS

| | | | |
|---|---|---|---|
| 3,245,868 | 4/1966 | Espenmiller et al. | 162—4 |
| 3,597,308 | 8/1971 | Brooks | 162—4 |
| 3,057,769 | 10/1962 | Sandberg | 162—4 |
| 3,577,312 | 5/1971 | Videen et al. | 162—164 X |
| 3,055,791 | 9/1962 | Elias | 162—4 |

FOREIGN PATENTS

| | | | |
|---|---|---|---|
| 668,224 | 11/1938 | Germany | 162—4 |

S. LEON BASHORE, Primary Examiner

A. D'ANDREA, JR., Assistant Examiner

U.S. Cl. X.R.

162—191; 241—28